United States Patent
Vilcova (10) Patent No.: US 8,339,771 B2
(45) Date of Patent: Dec. 25, 2012

(54) CONDUCTIVE ADHESIVE FOR USE IN A SOLID ELECTROLYTIC CAPACITOR

(75) Inventor: Silvie Vilcova, Lanskroun (CZ)

(73) Assignee: AVX Corporation, Myrtle Beach, SC (US)

( * ) Notice: Subject to any disclaimer, the term of this patent is extended or adjusted under 35 U.S.C. 154(b) by 351 days.

(21) Appl. No.: 12/708,875

(22) Filed: Feb. 19, 2010

(65) Prior Publication Data

US 2011/0205689 A1    Aug. 25, 2011

(51) Int. Cl.
*H01G 4/228* (2006.01)
*H01G 9/00* (2006.01)
*H01G 9/04* (2006.01)
*H01G 9/145* (2006.01)
*H01B 1/02* (2006.01)

(52) U.S. Cl. ......................... 361/540; 361/532; 252/514
(58) Field of Classification Search .................. 361/523, 361/532, 538, 533, 541, 540; 252/514
See application file for complete search history.

(56) References Cited

U.S. PATENT DOCUMENTS

| | | |
|---|---|---|
| 3,345,545 A | 10/1967 | Bourgault et al. |
| 4,085,435 A | 4/1978 | Galvagni |
| 4,093,972 A | 6/1978 | Voyles |
| 4,552,691 A * | 11/1985 | Shoji et al. ............... 252/514 |
| 4,625,261 A | 11/1986 | Weeks et al. |
| 4,720,740 A | 1/1988 | Clements et al. |
| 4,945,452 A | 7/1990 | Sturmer et al. |
| 5,005,107 A | 4/1991 | Kobashi et al. |
| 5,198,968 A | 3/1993 | Galvagni |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,729,428 A | 3/1998 | Sakata et al. |

(Continued)

FOREIGN PATENT DOCUMENTS

EP      0265077 A2    4/1988
(Continued)

OTHER PUBLICATIONS

Zednicek et al., New Technologies on Tantalum and Niobium Oxide Capacitors for Space-Limited Designs, Electronics Systemintegration Technology Conference, 2006. 1st, vol. 2, pp. 805-811.*

(Continued)

*Primary Examiner* — David M Sinclair
(74) *Attorney, Agent, or Firm* — Dority & Manning, P.A.

(57) ABSTRACT

A capacitor containing a solid electrolytic capacitor element and a conductive adhesive disposed between the capacitor element and another optional capacitor element, an electrode termination, or both, is provided. The conductive adhesive contains a plurality of spacer particles that are substantially spherical and have a relatively large diameter. The present inventors have discovered that the use of spacer particles having the desired size and shape can provide multiple benefits to the resulting capacitor. For example, the spacer particles can limit the degree to which the adhesive is compressed during manufacture, thereby ensuring that it will have the minimum thickness needed to achieve a reliable mechanical connection to the desired part. Further, when multiple capacitor elements are employed, the spacer particles can also help ensure that proper spacing is achieved between the different elements upon manufacture of the capacitor.

24 Claims, 5 Drawing Sheets

U.S. PATENT DOCUMENTS

| | | |
|---|---|---|
| 5,812,367 A | 9/1998 | Kudoh et al. |
| 5,949,639 A | 9/1999 | Maeda et al. |
| 6,191,936 B1 | 2/2001 | Webber et al. |
| 6,197,252 B1 | 3/2001 | Bishop et al. |
| 6,248,817 B1 * | 6/2001 | Takado .................. 524/127 |
| 6,322,912 B1 | 11/2001 | Fife |
| 6,391,275 B1 | 5/2002 | Fife |
| 6,416,730 B1 | 7/2002 | Fife |
| 6,527,937 B2 | 3/2003 | Fife |
| 6,576,099 B2 | 6/2003 | Kimmel et al. |
| 6,592,740 B2 | 7/2003 | Fife |
| 6,639,787 B2 | 10/2003 | Kimmel et al. |
| 6,674,635 B1 | 1/2004 | Fife et al. |
| 6,870,727 B2 | 3/2005 | Edson et al. |
| 7,116,548 B2 | 10/2006 | Satterfield, Jr. et al. |
| 7,220,397 B2 | 5/2007 | Kimmel et al. |
| 7,262,511 B2 | 8/2007 | Osako et al. |
| 7,271,995 B2 | 9/2007 | Edson et al. |
| 7,341,705 B2 | 3/2008 | Schnitter |
| 7,352,563 B2 | 4/2008 | Pelcak et al. |
| 7,381,396 B2 | 6/2008 | Thomas et al. |
| 7,419,926 B2 | 9/2008 | Schnitter et al. |
| 7,468,882 B2 * | 12/2008 | Marek et al. ............. 361/540 |
| 7,495,890 B2 | 2/2009 | Chacko |
| 7,524,893 B2 | 4/2009 | Terada et al. |
| 7,554,793 B2 | 6/2009 | Chacko |
| 7,656,647 B2 | 2/2010 | Edson et al. |
| 7,977,775 B2 * | 7/2011 | Yato et al. ................. 257/666 |
| 2005/0171273 A1 | 8/2005 | Ledwidge et al. |
| 2006/0038304 A1 * | 2/2006 | Osako et al. ............... 257/789 |
| 2008/0102294 A1 * | 5/2008 | Kitajima et al. ........... 428/457 |
| 2009/0104448 A1 | 4/2009 | Thompson et al. |
| 2009/0155597 A1 | 6/2009 | Kropp et al. |
| 2009/0161299 A1 | 6/2009 | Nemoto et al. |

FOREIGN PATENT DOCUMENTS

| | | |
|---|---|---|
| EP | 0265077 A3 | 4/1988 |
| JP | 05315200 A * | 11/1993 |
| JP | 2004339325 A * | 12/2004 |
| JP | 2005093741 A * | 4/2005 |

OTHER PUBLICATIONS

Zednicek, T., "New Tantalum Technologies, Tantalum Polymer, and Niobium Oxide Capacitors," 7 pages.

Product Information from Emerson & Cuming—Thermal Management Selector Guide, 2001, 2 pages.

* cited by examiner

CONDUCTIVE ADHESIVE FOR USE IN A SOLID ELECTROLYTIC CAPACITOR

BACKGROUND OF THE INVENTION

Solid electrolytic capacitors (e.g., tantalum capacitors) have been a major contributor to the miniaturization of electronic circuits and have made possible the application of such circuits in extreme environments. Many conventional solid electrolytic capacitors are formed with terminations that can be surface mounted onto a printed circuit board. The cathode termination of such capacitors is often attached to the capacitor element using a conductive adhesive. The present inventors have discovered, however, that conventional conductive adhesives can become compressed during manufacture of certain types of parts, such as highly volumetrically efficient capacitors or multi-anode capacitors. Among other things, the compression of the adhesive can reduce thickness and thereby lessen the reliability of the mechanical connection. As such, a need remains for a conductive adhesive for use in a solid electrolytic capacitor that is able to provide a more reliable mechanical connection when used in certain applications.

SUMMARY OF THE INVENTION

In accordance with one embodiment of the present invention, a capacitor is disclosed that comprises a first solid electrolytic capacitor element. The capacitor element includes an anode, dielectric, and a cathode that comprises a solid electrolyte. The capacitor also comprises an anode termination that is electrically connected to the anode and a cathode termination that is electrically connected to the cathode. Further, the capacitor comprises a conductive adhesive that is positioned between the capacitor element and an optional second capacitor element, the anode termination, the cathode termination, or a combination thereof. The conductive adhesive contains a plurality of spacer particles dispersed within a resinous material. The spacer particles are generally spherical and have a median diameter of from about 5 µm to about 200 µm.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a capacitor containing a solid electrolytic capacitor element that includes an anode, dielectric, and solid electrolyte. The capacitor also comprises a conductive adhesive disposed between the capacitor element and another optional capacitor element, an electrode termination, or both, to electrically connect the components. The conductive adhesive contains a plurality of spacer particles that are substantially spherical and have a relatively large diameter. As used herein, the term "substantially spherical" particles generally refers to regularly shaped, rounded particles that resemble spheres. It should be understood that such particles may contain surface incongruities and irregularities, but they typically still have a generally circular cross-section. The present inventors have discovered that the use of spacer particles having the desired size and shape can provide multiple benefits to the resulting capacitor. For example, the spacer particles can limit the degree to which the adhesive is compressed during manufacture, thereby ensuring that it will have the minimum thickness needed to achieve a reliable mechanical connection to the desired part. Further, when multiple capacitor elements are employed, the spacer particles can also help ensure that proper spacing is achieved between the different elements upon manufacture of the capacitor.

The average diameter of the spacer particles is typically small enough so that they do not adversely impact the volumetric efficiency of the capacitor. As indicated above, the spacer particles are likewise large enough to ensure that the adhesive attains the minimum thickness needed to achieve a reliable mechanical connection to another part (e.g., termination, another capacitor element, etc.). In most embodiments, the spacer particles thus have a median diameter of from about 5 µm to about 200 µm, in some embodiments from about 10 µm to about 150 µm, in some embodiments from about 20 µm to about 100 µm, and in some embodiments from about 30 µm to about 50 µm. The term "median" particle size as used herein refers to the "$D_{50}$" particle size distribution of the particles. As is well known in the art, the designation "$D_{50}$" means that at least 50% of the particles have the size indicated. The particles may likewise have a $D_{90}$ particle size distribution (at least 90% of the particles have the size indicated) of from about 5 µm to about 200 µm, in some embodiments from about 8 µm to about 150 µm, and in some embodiments, from about 10 µm to about 100 µm.

The materials used to form the spacer particles may vary. In certain embodiments, for example, the spacer particles are formed from an electrically conductive material (e.g., metal) to enhance the electrical contact between the capacitor element and another part. Examples of suitable conductive materials include, for instance, metals, such as nickel, copper, gold, silver, silver coated copper, silver coated nickel, etc., carbon materials, such as graphite, nickel coated carbon, etc.; and so forth. Alternatively, the spacer particles may be formed from a nonconductive material, such as synthetic insulative polymers (e.g., polyolefins, polyamides, etc.), glass, etc. If desired, such nonconductive materials may optionally be coated with a conductive material (e.g., metal, carbon, etc.).

When formed from an electrically conductive material, the spacer particles of the present invention may serve as the primary mechanism for imparting conductivity to the adhesive. In such embodiments, the spacer particles typically constitute from about 0.5 wt. % to about 50 wt. %, in some embodiments from about 1 wt. % to about 25 wt. %, and in some embodiments, from about 2 wt. % to about 10 wt. % of the adhesive, on a dry basis. Of course, conventional conductive filler particles may also be employed if desired to enhance conductivity. The filler particles may possess any desired shape, such as flake, nodular, spherical, fiber, tube, etc., and may include those materials described above, as well as other non-spherical materials, e.g., carbon nanotubes, carbon nanofibers, etc. The filler particles are, however, typically smaller in size than the spacer particles. For instance, the filler particles may have a median size (e.g., diameter) of about 5 μm or less, in some embodiments from about 0.05 to about 4 μm, and in some embodiments, from about 0.1 to about 3 μm. When employed, the weight ratio of the filler particles to the spacer particles may range from about 90 to about 1, in some embodiments from about 80 to about 5, and in some embodiments, from about 70 to about 10. For example, the filler particles may constitute from about 0.5 wt. % to about 80 wt. %, in some embodiments from about 1 wt. % to about 50 wt. %, and in some embodiments, from about 2 wt. % to about 25 wt. % of the adhesive, on a dry basis. In such embodiments, the spacer particles may likewise constitute from about 0.1 wt. % to about 10 wt. %, in some embodiments from about 0.5 wt. % to about 5 wt. %, and in some embodiments, from about 1 wt. % to about 3 wt. % of the adhesive, on a dry basis.

The conductive adhesive also generally contains a resinous material within which the spacer particles and optional filler particles are dispersed. Although any resinous material may be employed, it is generally desired to use a resin that is a curable thermosetting resin, such as an epoxy resin, melamine resin, maleimide resin, polyimide resin, phenolic resin, etc. Epoxy resins are particularly suitable for use in the present invention. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. Still other suitable conductive adhesive resins may also be described in U.S. Patent Application Publication No. 2006/0038304 to Osako, et al. and U.S. Pat. No. 7,554,793 to Chacko, which are incorporated herein in their entirety by reference thereto for all purposes. Typically, the resinous material constitutes from about 0.5 wt. % to about 50 wt. %, in some embodiments from about 1 wt. % to about 25 wt. %, and in some embodiments, from about 2 wt. % to about 15 wt. % of the dry weight of the adhesive.

If desired, curing agents may also be employed in the adhesive to help promote curing. The curing agents typically constitute from about 0.1 to about 20 wt. % of the adhesive. Exemplary curing agents include, for instance, amines, peroxides, anhydrides, phenol compounds, acid anhydride compounds and combinations thereof. Specific examples of suitable curing agents are dicyandiamide, 1-(2 cyanoethyl) 2-ethyl-4-methylimidazole, 1-benzyl 2-methylimidazole, ethyl cyano propyl imidazole, 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, etc. Still other useful curing agents include phosphine compounds, such as tributylphosphine, triphenylphosphine, tris(dimethoxyphenyl)phosphine, tris(hydroxypropyl)phosphine, and tris(cyanoethyl)phosphine; phosphonium salts, such as tetraphenylphosphonium-tetraphenylborate, methyltributylphosphonium-tetraphenylborate, and methyltricyanoethylphosphonium tetraphenylborate); amines, such as 2,4,6-tris(dimethylaminomethyl)phenol, benzylmethylamine, tetramethylbutylguanidine, N-methylpiperazine, and 2-dimethylamino-1-pyrroline; ammonium salts, such as triethylammonium tetraphenylborate; diazabicyclo compounds, such as 1,5-diazabicyclo[5,4,0]-7-undecene, 1,5-diazabicyclo[4,3,0]-5-nonene, and 1,4-diazabicyclo[2,2,2]-octane; salts of diazabicyclo compounds such as tetraphenylborate, phenol salt, phenolnovolac salt, and 2-ethylhexanoic acid salt; and so forth.

Still other additives may also be employed, such as photoinitiators, viscosity modifiers, suspension aiding agents, pigments, stress reducing agents, coupling agents (e.g., silane coupling agents), nonconductive fillers (e.g., clay, silica, alumina, etc.), stabilizers, etc. Suitable photoinitiators may include, for instance, benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone, 2-chlorothioxanthone, etc. When employed, such additives typically constitute from about 0.1 to about 20 wt. % of the total composition.

The conductive adhesive may generally be applied to one or more surfaces of the capacitor element, termination, or both. Any of a variety of techniques may be employed to apply the adhesive, such as screen-printing, dipping, electrophoretic coating, electron beam deposition, spraying, roller pressing, brushing, doctor blade casting, vacuum deposition, coating, etc. To aid in the application of the adhesive, its viscosity may be selectively controlled, such as within a range of from about 5 to about 200 Pascal-seconds, in some embodiments from about 10 to about 150 Pascal-seconds, and in some embodiments, from about 20 to about 100 Pascal-seconds, as measured with a Brookfield DV-1 viscometer using Spindle No. 18 operating at 12 rpm and 25° C. If desired, thickeners, viscosity modifiers, solvents, etc. may be employed in the adhesive to increase or decrease viscosity.

Once applied to the desire surface, the conductive adhesive may be cured as mentioned above using any of a variety of known techniques, such as heat curing, actinic radiation curing (e.g., ultraviolet radiation, e-beam radiation, infrared radiation, etc.), and so forth. The thickness of the resulting conductive adhesive may be relatively thin and still achieve the desired binding of the capacitor element to another part. For example, the thickness of the adhesive may range from about 1 to about 150 micrometers, in some embodiments from about 5 to about 100 micrometers, and in some embodiments, from about 10 to about 50 micrometers.

In addition to the conductive adhesive, the capacitor of the present invention also includes at least one capacitor element containing an anode, dielectric, and solid electrolyte. The anode may be formed from a valve metal composition having a high specific charge, such as about 5,000 µF*V/g or more, in some embodiments about 25,000 µF*V/g or more, in some embodiments about 40,000 µF*V/g or more, and in some embodiments, from about 70,000 to about 200,000 µF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. In addition to the techniques described above, any other technique for constructing the anode body may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvaqni, et al.; U.S. Pat. No. 5,495,386 to Kulkarni; and U.S. Pat. No. 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

An anode lead (e.g., wire, sheet, etc.) may be electrically connected to the anode using a variety of ways, such as by coupling the lead using resistance or laser welding. Alternatively, the lead may be embedded into the anode body during its formation (e.g., prior to sintering). Regardless, the lead is typically formed from any electrically conductive material, such as tantalum, niobium, nickel, aluminum, hafnium, titanium, etc., as well as oxides and/or nitrides of thereof.

Once constructed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic)acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Once the dielectric layer is formed, a protective coating may optionally be applied, such as one made of a relatively insulative resinous material (natural or synthetic). Such materials may have a specific resistivity of greater than about 10 $\Omega$/cm, in some embodiments greater than about 100, in some embodiments greater than about 1,000 $\Omega$/cm, in some embodiments greater than about $1 \times 10^5$ $\Omega$/cm, and in some embodiments, greater than about $1 \times 10^{10}$ $\Omega$/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, a conductive polymer coating may be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H. C. Starck. CLEVIOS C is a commercially available catalyst for CLEVIOS M, which is 3,4-ethylene dioxythiophene, a PEDT monomer also sold by H. C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., CLEVIOS C) may also be mixed with the material(s) used to form the optional protective coating (e.g., resinous materials). In such instances, the anode part may then be dipped into a solution containing the monomer (CLEVIOS M). As a result, the monomer can contact the catalyst within and/or on the surface of the protective coating and react therewith to form the conductive polymer coating. Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, at al., U.S. Pat. No. 5,729,428 to Sakata, et al., and U.S. Pat. No. 5,812,367 to Kudoh, et al., which are incorporated herein in their entirety by reference thereto for all purposes.

In most embodiments, once applied, the solid electrolyte is healed. Healing may occur after each application of a solid electrolyte layer or may occur after the application of the entire coating. In some embodiments, for example, the solid electrolyte may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 Volts and then dipped in sulfuric acid and applied with about 2 Volts. In this embodiment, the use of the second low voltage sulfuric acid solution or toluene sulfonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

If desired, the part may optionally be applied with an external coating. The external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 µm to about 50 µm, in some embodiments from about 2 µm to about 30 µm, and in some embodiments, from about 5 µm to about 10 µm. Likewise, the thickness of the metal layer is typically within the range of from about 1 µm to about 100 µm, in some embodiments from about 5 µm to about 50 µm, and in some embodiments, from about 10 µm to about 25 µm.

As indicated above, the electrolytic capacitor of the present invention also contains an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The capacitor also typically contains a case that encapsulates the capacitor element(s). The case may be filled with an encapsulant material, such as silica. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element is encapsulated so that at least a portion of the anode and cathode terminations are exposed for mounting onto a circuit board.

The manner in which the conductive adhesive of the present invention is incorporated into the capacitor depends in part on the particular capacitor configuration. In one embodiment, for example, the capacitor contains a single capacitor element, and the conductive adhesive of the present invention is used to electrically connect the capacitor element to a cathode termination.

Figure 1:
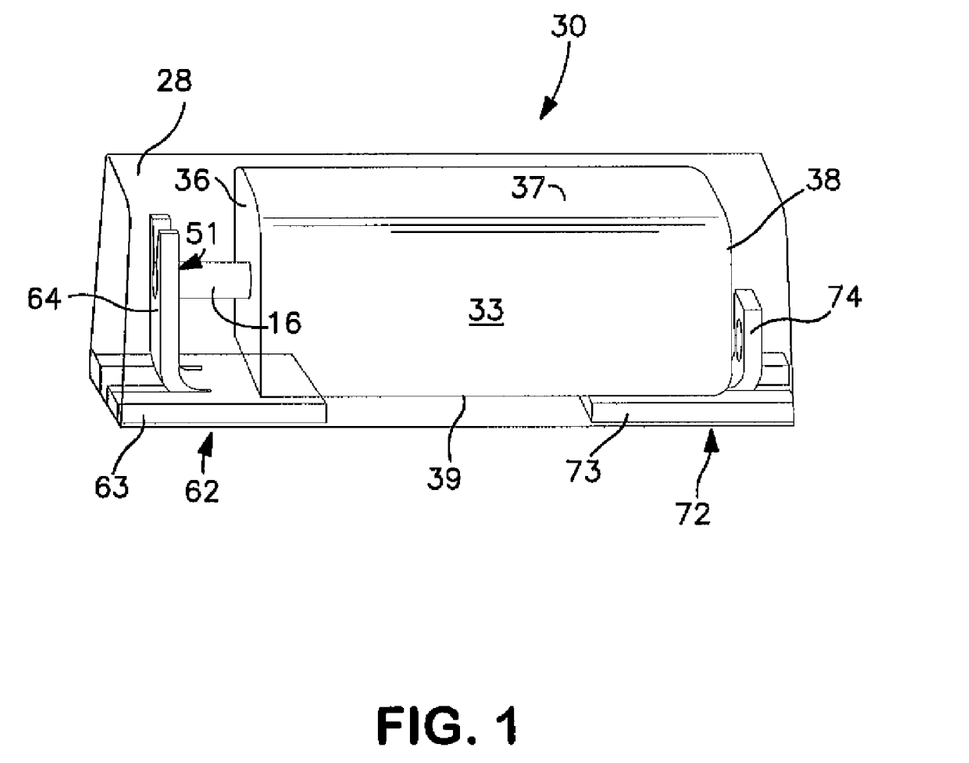
FIG. 1 is a perspective view of one embodiment of the capacitor of the present invention.

Referring to FIG. 1, one such embodiment of a capacitor 30 is shown that includes an anode termination 62 and a cathode termination 72 in electrical connection with a single capacitor element 33. The capacitor element 33 has an upper surface 37, lower surface 39, front surface 36, and rear surface 38. Although it may be in electrical contact with any of the surfaces of the capacitor element 33, the cathode termination 72 in the illustrated embodiment is in electrical contact with the lower surface 39 and rear surface 38. More specifically, the cathode termination 72 contains a first component 73 positioned substantially perpendicular to a second component 74. The first component 73 is in electrical contact and generally parallel with the lower surface 39 of the capacitor element 33. The second component 74 is in electrical contact and generally parallel to the rear surface 38 of the capacitor element 33. Although depicted as being integral, it should be understood that these portions may alternatively be separate pieces that are connected together, either directly or via an additional conductive element (e.g., metal).

The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. In the illustrated embodiment, the region 51 possesses a "U-shape" for further enhancing surface contact and mechanical stability of the lead 16.

To attach the electrolytic capacitor element 33, a conductive adhesive (not shown), such as one containing spacer particles in accordance with the present invention, is applied to a surface of the cathode termination 72. The conductive adhesive may, for example, be positioned between the capacitor element 33 and the first and second components 72 and 74 of the cathode termination 72. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 may be electrically connected to the region 51 using any technique known in the art, such as mechanical welding, laser welding, conductive adhesives, etc. For example, the anode lead 16 may be welded to the anode termination 62 using a laser. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive. Once the capacitor element 33 is attached, the lead frame may be enclosed within a resin casing 28, which may then be filled with silica or any other known encapsulating material.

In the embodiment described above and shown in FIG. 1, the conductive adhesive of the present invention electrically connects the cathode termination to a capacitor element. The adhesive may also be used to connect the anode termination to the anode lead. Furthermore, the adhesive may be used to connect two or more capacitor elements, either directly or via a conductive material (e.g., cathode termination).

Referring to FIGS. 2-8, for example, one embodiment of a capacitor 164 is shown that contains two capacitor elements 122 and 124 electrically connected by the conductive adhesive of the present invention. In this embodiment, the capacitor elements have a generally rectangular prismatic shape and are stacked so that the surfaces having the largest areas are positioned adjacent to each other to optimize the volumetric efficiency of the capacitor 164. That is, a surface 190 of the capacitor element 122 defined by its width (−x direction) and length (−y direction) is placed adjacent to a corresponding surface 180 of the capacitor element 124. The capacitor elements 122 and 124 may be stacked in a vertical configuration, wherein the surface 190 is provided in a plane that is substantially perpendicular to the −x and/or −y directions, as well as in a horizontal configuration, wherein the surface 190 is provided in a plane that is substantially perpendicular to the −z direction. In the embodiment depicted, for example, the capacitor elements 122 and 124 are horizontally stacked in a plane perpendicular to the −z direction. It should be understood that the capacitor elements 122 and 124 need not extend in the same direction. For example, the surface 190 of the capacitor element 122 may be provided in a plane that is substantially perpendicular to the −x direction, while the surface 180 of the capacitor element 124 is provided in a plane that is substantially perpendicular to the −y direction. Desirably, however, both capacitor elements 122 and 124 extend in substantially the same direction.

Figure 2:
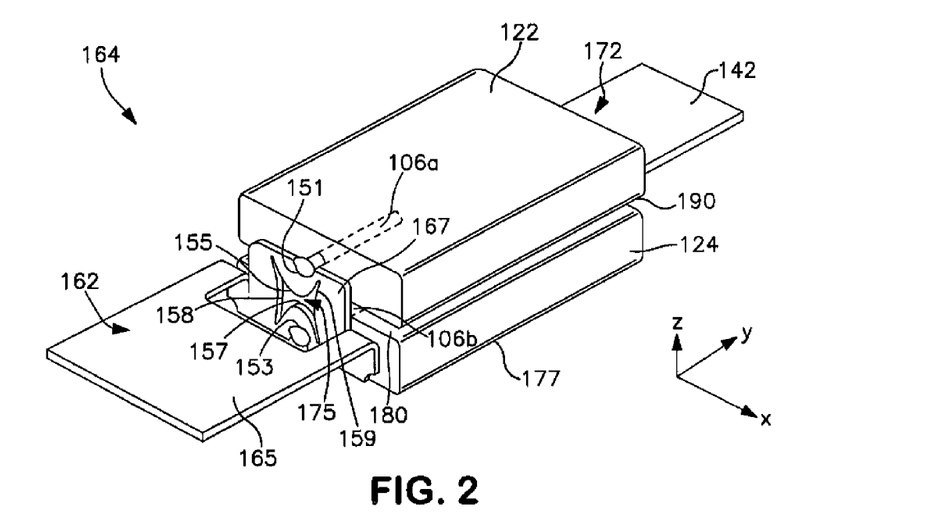
FIG. 2 is a perspective view of another embodiment of the capacitor of the present invention.

In this particular embodiment, the capacitor elements 122 and 124 are connected together via a cathode termination 172. As will be described in more detail below, the conductive adhesive of the present invention may be used to connect the first capacitor element 122 and/or the second capacitor element 124 to the termination 172. It should also be understood that the capacitor element 122 and 124 may be directly connected together by the conductive adhesive without the use of the termination. In such embodiments, the cathode termination may simply be positioned in contact with an upper and/or lower surface of one of the capacitor elements.

Referring again to FIG. 2, the cathode termination 172 of the capacitor 164 is initially provided in a plane that is generally parallel to the bottom surface 177 of the capacitor 164. The cathode termination 172 may also contain an exposed portion 142 that may be subsequently bent to form a mounting terminal. Thus, although the portion of the cathode termination 172 positioned between the capacitor elements 122 and 124 will generally remain parallel to the bottom surface 177, the exposed portion 142 may be positioned at any of a variety of angles relative (e.g., perpendicular) to the surface 177 in the final capacitor 164 based on the manner in which it is bent.

The capacitor 164 also includes an anode termination 162 that is formed from a first portion 165 and a second portion 167. As shown in FIG. 2, the first portion 165 is integral with the second portion 167. It should be understood, however, that these portions 165 and 167 may alternatively be separate pieces that are connected together, either directly or via an additional conductive element (e.g., metal). In the illustrated embodiment, the first portion 165 is initially provided in a plane that is substantially parallel to the bottom surface 177 of the capacitor 164. The first portion 165 may be subsequently bent to form a mounting terminal, Thus, the first portion 165 may be positioned at any of a variety of angles relative (e.g., perpendicular) to the surface 177 in the final capacitor 164 based on the manner in which it is bent.

The second portion 167 of the anode termination 162 is provided in a plane that is generally perpendicular to the bottom surface 177 of the capacitor 164. The second portion 167 possesses an upper region 151 that is electrically connected to an anode lead 106a and a lower region 153 that is electrically connected to an anode lead 106b. As shown, the second portion 167 holds the anode leads 106a and 106b in substantial horizontal alignment (i.e., in the −x direction) to further enhance the dimensional stability of the capacitor 164. The regions 151 and 153 may also have a "U-shape" for further enhancing surface contact and mechanical stability of the leads 106a and 1066b. The second portion 167 may also contain an upper arcuate surface 155 and a lower arcuate surface 157 positioned adjacent to respective upper and lower regions 151 and 153. An opening 175 is defined between the arcuate surfaces 155 and 157 that facilitates the handling of the anode termination 162 while connecting it to the capacitor elements 122 and 124. Although not required, the second portion 167 also includes two additional opposing arcuate surfaces 158 and 159, which may further enhance the strength of the second portion 167. When configured in the manner described above, the anode termination 162 may be readily connected to the capacitor elements 122 and 124 in an efficient, yet effective manner.

One embodiment of a technique for forming the capacitor 164 shown in FIGS. 3-8 will now be described in more detail.

Figure 3:
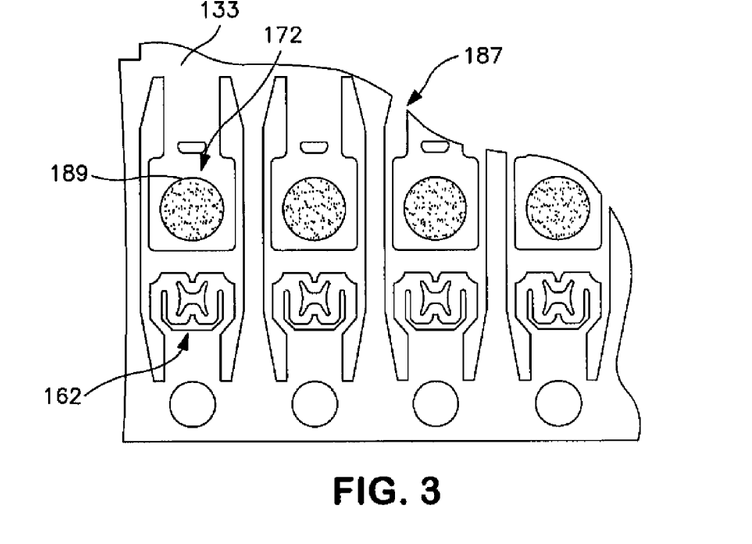
FIG. 3 is a cut-away, top view of one embodiment of a lead frame for use in the present invention.
Figure 4:
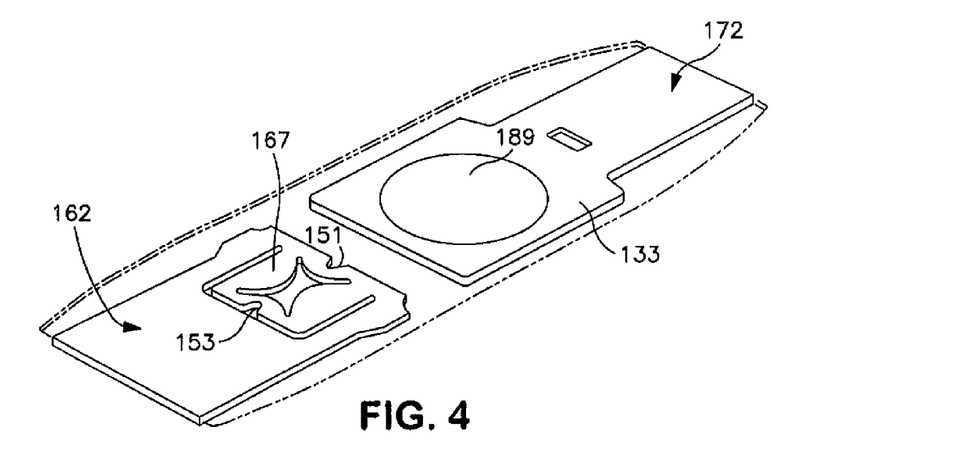
FIG. 4 is a perspective view of one embodiment of a portion of a lead frame for use in the present invention.
Figure 5:
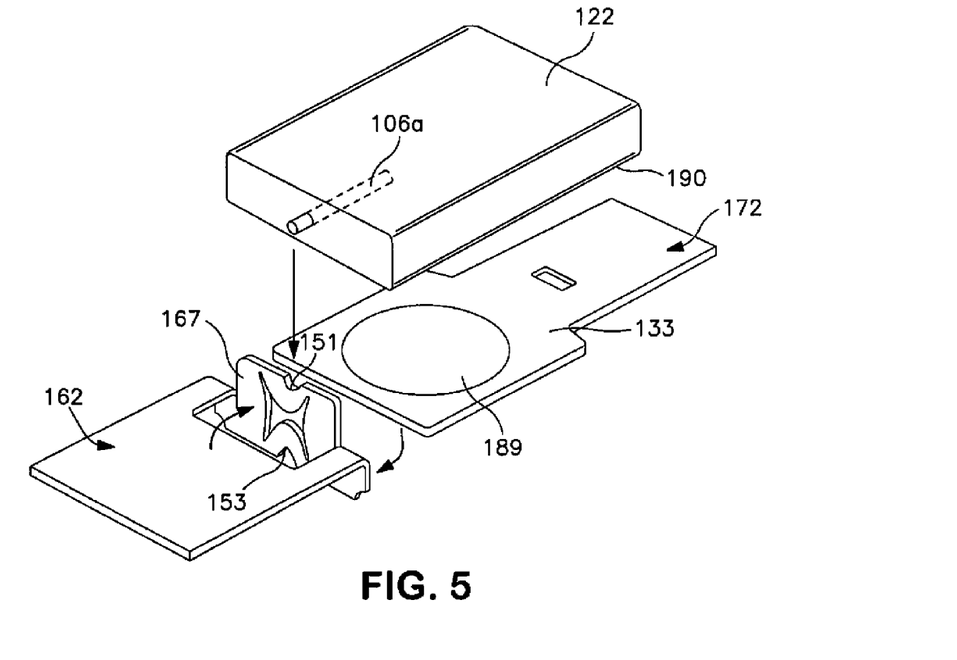
FIG. 5 is a perspective view of one embodiment for mounting a first capacitor element onto the lead frame shown in FIG. 4.

In this regard, FIG. 3 illustrates a lead frame 187 that may be utilized to form multiple capacitor assemblies in accordance with the present invention. When multiple capacitor element assemblies are manufactured in bulk, the lead frame 187 may be cut into individual assemblies (as shown in FIG. 4) after the capacitor elements are attached to the frame 187. An exemplary manner in which such capacitor elements are attached to the lead frame 187 will be described for sake of simplicity with reference to a single capacitor assembly.

Figure 6:
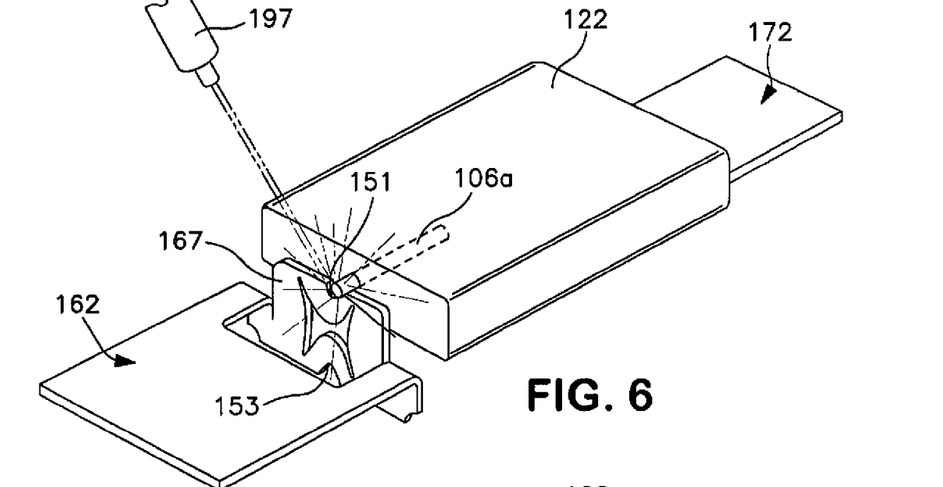
FIG. 6 is a perspective view of one embodiment for laser welding the first capacitor element shown in FIG. 5 to the lead frame.

Initially, a conductive adhesive 189, such as one containing spacer particles in accordance with the present invention, is applied to a surface 133 of the cathode termination 172. As indicated by the directional arrows shown in FIG. 5, the second portion 167 of the anode termination 162 is bent upward so that the portion 167 is positioned substantially perpendicular to the surface 190 of the capacitor element 122. Thereafter, the capacitor element 122 is positioned on the surface 133 of the cathode termination 172 so that its bottom surface 190 contacts the adhesive 189 and the anode lead 106a is received by the upper U-shaped region 151. The anode lead 106a is then electrically connected to the upper region 151 using any technique known in the art, such as mechanical welding, laser welding, conductive adhesives, etc. For example, as shown in FIG. 6, the anode lead 6a may be welded to the upper region 151 using a laser 197. Upon electrically connecting the anode lead 106a to the anode termination 162, the conductive adhesive 189 may then be cured.

Figure 7:
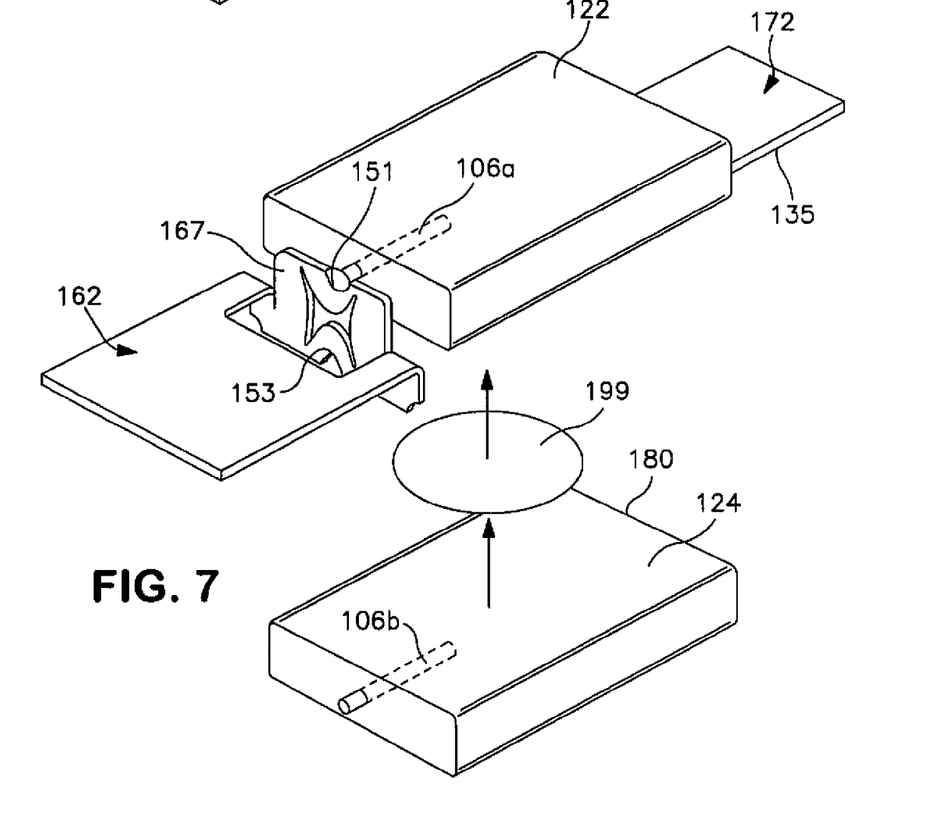
FIG. 7 is a perspective view of one embodiment for mounting a second capacitor element onto the lead frame shown in FIG. 4.
Figure 8:
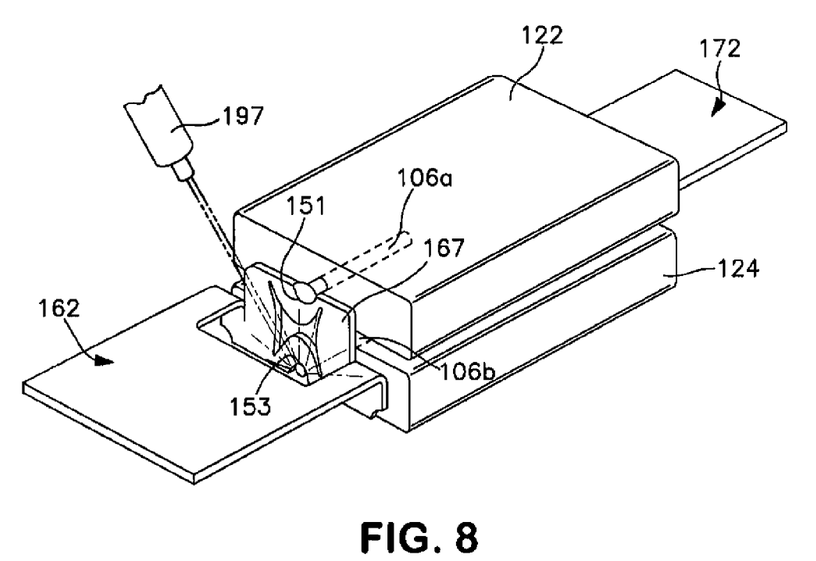
FIG. 8 is a perspective view of one embodiment for laser welding the second solid electrolytic capacitor shown in FIG. 7 to the lead frame.

Referring to FIG. 7, another conductive adhesive 199, such as one containing spacer particles in accordance with the present invention, is then applied to an opposing surface 135 of the cathode termination 172. Subsequently, the second capacitor element 124 is positioned adjacent to the surface 135 of the cathode termination 172 so that its top surface 180 contacts the adhesive 199 and the anode lead 106b is received by the lower U-shaped region 153. The anode lead 106b is then electrically connected to the lower region 153, such as with the laser welder 197 shown in FIG. 8. If desired, the laser welder 197 may also be positioned on the other side of the capacitor 164 during welding to reduce the extent of interference with the other components of the assembly. As described above, a heat press may be used to apply heat and pressure to ensure that the capacitor element 124 is adequately adhered to the cathode termination 172 by the adhesive 199. It should also be understood, however, that the adhesives 189 and 199 may be cured simultaneously so that separate heat pressing steps are not required.

Once the capacitor elements are attached, the lead frame is enclosed within a resin casing, such as described above, which be filled with silica or any other known encapsulating material. After encapsulation, exposed portions 165 and 142 of the respective anode and cathode terminations 162 and 172 may be trimmed and bent along the outside of the casing (e.g., at an approximately 90° angle). In this manner, the portions 165 and 142 form J-shaped leads for the finished capacitor 164, although any other known configuration may also be formed in accordance with the present invention.

The present invention may be better understood by the following example.

Test Procedures

Equivalent Series Resistance (ESR), Capacitance, and Dissipation Factor:

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 2 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

Example

Initially, two (2) batches of capacitor elements (10.000 samples each) were formed from tantalum anodes having a size of 4.10 mm (length)×2.75 mm (width)×0.65 mm (thickness). Each anode was embedded with a tantalum wire, sintered at 1300° C., and pressed to a density of 6.3 g/cm$^3$. To anodize the tantalum anode, it was dipped into an orthophosphoric acid/water solution having a conductivity of 8.6 mS/cm and temperature of 85° C. The samples were dipped into a conventional aqueous solution of manganese(II) nitrate and dried to achieve an $MnO_2$ cathode. All parts were then dipped sequentially into a graphite dispersion and in a silver dispersion and dried. The tantalum wire of each of the resulting capacitor elements was then laser welded to a cut-out portion of a lead frame, The lead frame was made NILO-based material.

To attach the cathode of the capacitor elements to the lead frame of the first batch of samples, a silver-loaded epoxy adhesive (ECCOBOND CE3513 from Henkel) was employed that also contained 4% silver spacer particles (size of 35 μm). The resulting capacitor element/silver-spacer-loaded epoxy/lead frame systems were then cured at 195° C. for 60 seconds.

For purpose of comparison, a silver-loaded epoxy adhesive (ECCOBOND CE3513 from Henkel) without the silver spacer particles was also used to attach the cathode to the lead frame of the second batch of samples. The resulting capacitor element/silver-loaded epoxy/lead frame systems were then cured at 195° C. for 60 seconds.

The resulting parts were completed using conventional assembly technology and then tested for average electrical performance (i.e., leakage current ("DCL"), capacitance, dissipation factor ("Df"), and equivalent series resistance ("ESR"). The results are set forth below.

| Batch No. | % Rejected | | Median of Electrical Properties | | | |
|---|---|---|---|---|---|---|
| | Mechanical [%] | Electrical [%] | DCL [μA] | CAP [μF] | Df | ESR [Ω] |
| 1 (with spacer particles) | 1.6 | 5.9 | 1.04 | 142.01 | 0.052 | 0.087 |
| 2 (without spacer particles) | 12.4 | 6.3 | 1.14 | 144.36 | 0.058 | 0.086 |
| limit | | | 11.00 | | 0.160 | 0.190 |

As indicated, the mechanical rejects for the first batch of capacitor elements (with the spacer particles) was significantly lower than that of the second batch (without spacer particles).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor comprising:
a first solid electrolytic capacitor element that includes an anode, dielectric, and a cathode that comprises a solid electrolyte;
an anode termination that is electrically connected to the anode;
a cathode termination that is electrically connected to the cathode; and
a conductive adhesive that is positioned between the capacitor element and an optional second capacitor element, the anode termination, the cathode termination, or a combination thereof, wherein the conductive adhesive contains a plurality of spacer particles dispersed within a resinous material, wherein the spacer particles are generally spherical and have a median diameter of from about 5 µm to about 200 µm, wherein the conductive adhesive further comprises a plurality of filler particles dispersed within the resinous material, wherein the filler particles have a median size of from about 0.05 to about 4 µm, and wherein the weight ratio of the filler particles to the spacer particles is from about 90 to about 1.

2. The capacitor of claim 1, wherein the spacer particles have a median diameter of from about 20 µm to about 100 µm.

3. The capacitor of claim 1, wherein the spacer particles contain a conductive material.

4. The capacitor of claim 3, wherein the spacer particles contain silver.

5. The capacitor of claim 1, wherein the resinous material includes a thermoset resin.

6. The capacitor of claim 5, wherein the thermoset resin includes an epoxy resin.

7. The capacitor of claim 1, wherein an anode lead extends from the anode and is attached to the anode termination.

8. The capacitor of claim 1, wherein the anode includes tantalum, niobium, or an electrically conductive oxide thereof.

9. The capacitor of claim 1, wherein the solid electrolyte includes manganese dioxide, a conductive polymer, or a combination thereof.

10. The capacitor of claim 1, wherein the first capacitor element further comprises an external coating, the external coating including a carbonaceous layer and a metal layer.

11. The capacitor of claim 1, wherein the conductive adhesive is in contact with the first capacitor element and the second capacitor element.

12. The capacitor of claim 1, wherein the conductive adhesive is in contact with the first capacitor element and the cathode termination.

13. The capacitor of claim 1, wherein the first capacitor element has an upper surface and an opposing lower surface, and further wherein the cathode termination contains a first component that is generally parallel to the lower surface of the first capacitor element.

14. The capacitor of claim 13, wherein the conductive adhesive is positioned between the lower surface of the first capacitor element and the first component of the cathode termination.

15. The capacitor of claim 13, wherein the first component of the cathode termination is positioned between the first capacitor element and the second capacitor element.

16. The capacitor of claim 15, wherein the conductive adhesive is positioned between the first capacitor element and the first component of the cathode termination, between the second capacitor element and the first component of the cathode termination, or both.

17. The capacitor of claim 13, wherein the first element also has a front surface and an opposing rear surface, wherein an anode lead extends from the front surface, and further wherein the cathode termination comprises a second component that is positioned generally perpendicular to the first component and generally parallel to the rear surface of the first capacitor element.

18. The capacitor of claim 17, wherein the conductive adhesive is positioned between the second component of the cathode termination and the rear surface of the first capacitor element.

19. A capacitor comprising:
a first solid electrolytic capacitor element that includes an anode, dielectric, and a cathode that comprises a solid electrolyte and an external coating, wherein the anode includes tantalum or niobium oxide, the solid electrolyte includes manganese dioxide or a conductive polymer, and the external coating includes a carbonaceous layer and a metal layer;
an anode termination that is electrically connected to the anode;
a cathode termination that is electrically connected to the cathode; and
a conductive adhesive that is positioned between the capacitor element and an optional second capacitor element, the anode termination, the cathode termination, or a combination thereof, wherein the conductive adhesive contains a plurality of spacer particles dispersed within a resinous material, wherein the spacer particles are generally spherical and have a median diameter of from about 5 µm to about 200 µm, wherein the conductive adhesive further comprises a plurality of filler particles dispersed within the resinous material, wherein the filler particles have a median size of from about 0.05 to about 4 µm, and wherein the weight ratio of the filler particles to the spacer particles is from about 90 to about 1.

20. The capacitor of claim 19, wherein the spacer particles have a median diameter of from about 20 µm to about 100 µm.

21. The capacitor of claim 19, wherein the conductive adhesive is in contact with the first capacitor element and the second capacitor element.

22. The capacitor of claim 19, wherein the conductive adhesive is in contact with the first capacitor element and the cathode termination.

23. The capacitor of claim 19, wherein the spacer particles contain a conductive material.

24. The capacitor of claim 23, wherein the spacer particles contain silver.

* * * * *